(12) United States Patent
Igarashi et al.

(10) Patent No.: US 8,061,047 B2
(45) Date of Patent: Nov. 22, 2011

(54) ACTIVE POSITIONING OF DOWNHOLE DEVICES USING SPHERICAL MOTORS

(75) Inventors: Juei Igarashi, Yokohama (JP); Brian W. Cho, Yokohama (JP); Hideyuki Kamei, Yokohama (JP); Hitoshi Sugiyama, New Malden (GB); Paolo Primiero, Al-Khobar (SA); Hitoshi Tashiro, Kamakura (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 421 days.

(21) Appl. No.: 12/420,804

(22) Filed: Apr. 8, 2009

(65) Prior Publication Data

US 2010/0258321 A1   Oct. 14, 2010

(51) Int. Cl.
*E21B 47/022* (2006.01)
(52) U.S. Cl. .............................. 33/302; 33/304
(58) Field of Classification Search .............. 33/302, 33/303, 304, 313; 175/44, 45
See application file for complete search history.

(56) References Cited

U.S. PATENT DOCUMENTS

| | | | | |
|---|---|---|---|---|
| 3,079,696 A | * | 3/1963 | Van Rooyen et al. | 33/304 |
| 4,197,654 A | * | 4/1980 | Van Steenwyk et al. | 33/304 |
| 4,397,098 A | | 8/1983 | Franz | |
| RE33,708 E | * | 10/1991 | Roesler | 33/304 |
| 5,063,680 A | | 11/1991 | Wirt et al. | |
| 5,676,212 A | * | 10/1997 | Kuckes | 175/45 |
| 5,821,414 A | * | 10/1998 | Noy et al. | 33/304 |
| 6,370,784 B1 | | 4/2002 | Hunter et al. | |
| 6,895,678 B2 | * | 5/2005 | Ash et al. | 33/313 |
| 7,099,235 B2 | | 8/2006 | Kamata | |
| 2010/0089572 A1 | * | 4/2010 | Chang et al. | 33/313 |
| 2010/0163308 A1 | * | 7/2010 | Farley et al. | 175/45 |

FOREIGN PATENT DOCUMENTS

| | | |
|---|---|---|
| JP | 2000270569 | 9/2000 |
| JP | 2007135266 | 5/2007 |
| JP | 2007135267 | 5/2007 |
| JP | 2007135268 | 5/2007 |
| JP | 2007135269 | 5/2007 |
| JP | 2007135270 | 5/2007 |
| JP | 2007221845 | 8/2007 |
| JP | 2007221846 | 8/2007 |

OTHER PUBLICATIONS

"High performance MEMS Silicon Ring Gyro CRS09 (Samples Available)," (http://www.sssj.co.jp/en/products/gyro/crs09.html), Silicon Sensing Systems Japan Ltd., Jun. 2, 2009.
"SCA610 Series Accelerometer/Inclinometer," (http://www.vti.fi/midcom-serveattachmentguid-69838626362911dd8b327d614b19a938a938/sca610_accelerometer_rev_3.pdf), VTI Technologies, Dec. 30, 2005.
"SCA620 Series Accelerometer," (http://www.vti.fi/midcom-serveattachmentguid-d343b9ec362811ddb00ad7313e440e2a0e2a/sca620_accelerometer_rev_2_021106.pdf), VTI Technologies, Nov. 2, 2006.
"Geospace, geophones hydrophones sensors," (http://www.oyogeospace.com/pdfs/technologies_brochure.pdf), Oyo Geospace, Jun. 4, 2009.

\* cited by examiner

*Primary Examiner* — Brad Bennett
(74) *Attorney, Agent, or Firm* — Daryl R. Wright; Jody DeStefanis; Jeff Griffin

(57) ABSTRACT

Methods and related systems are described for downhole positioning of sensors such as accelerometers, gyroscopes, tiltmeters and geophones. The sensor or sensors are mounted within the spherical rotor of a spherical motor such that the device can be actively positioned in one or more orientations by activating the spherical motor.

45 Claims, 11 Drawing Sheets

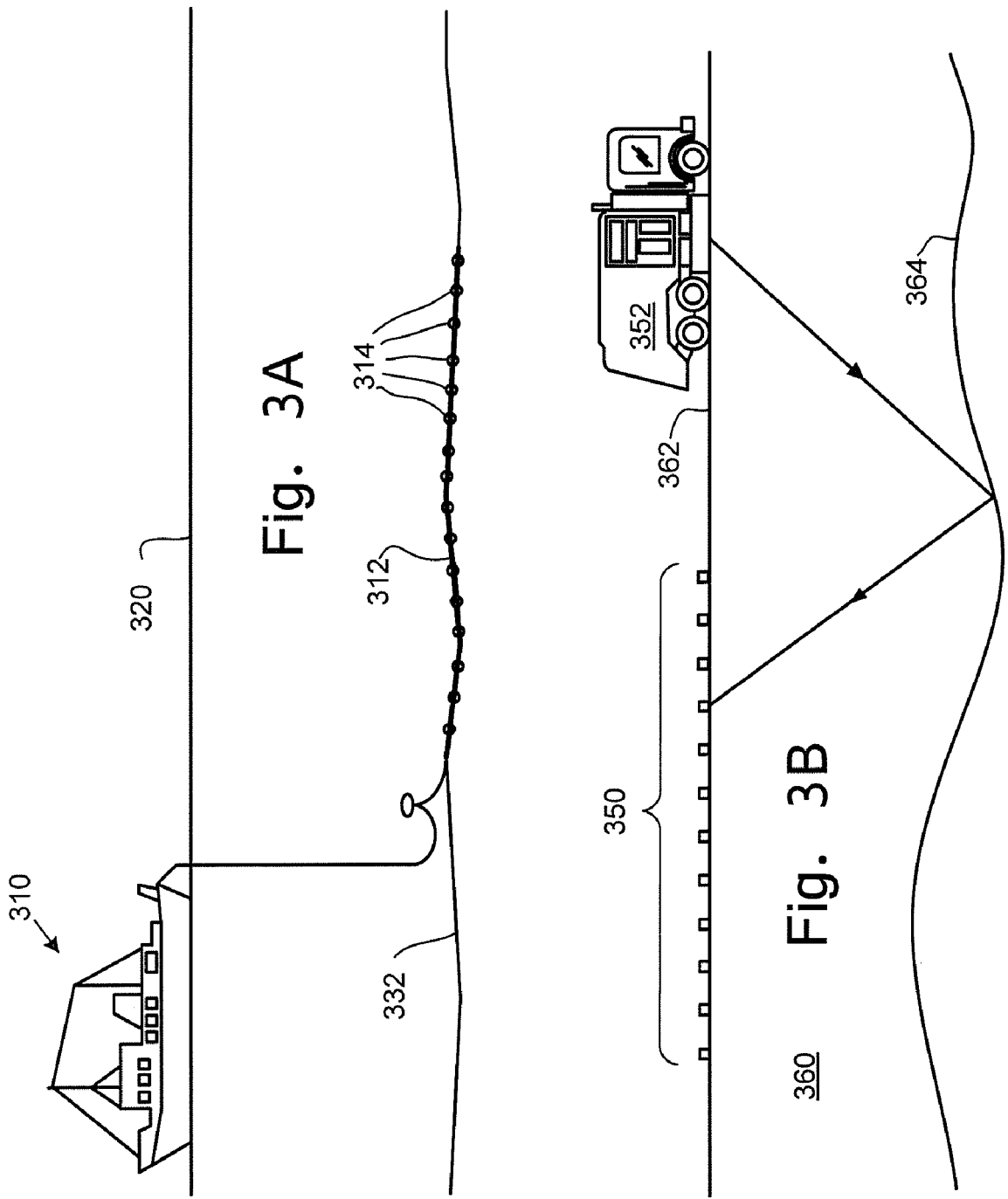

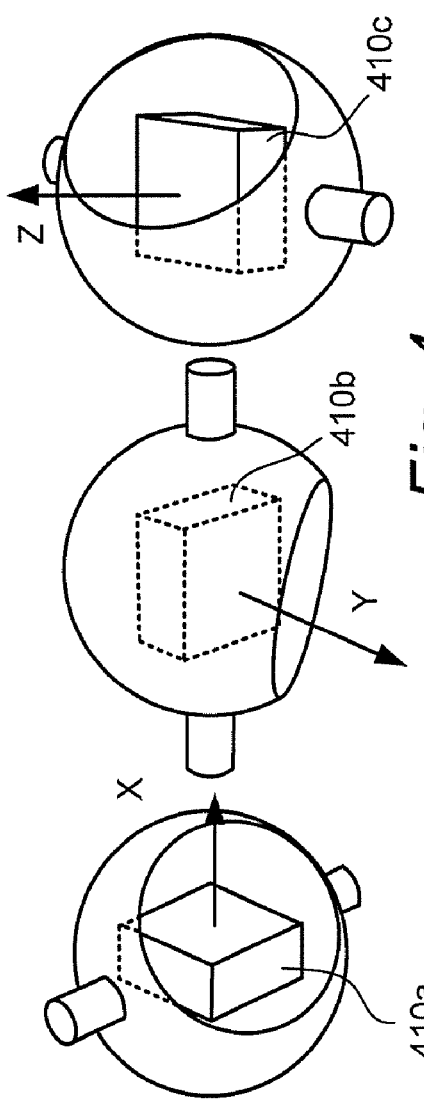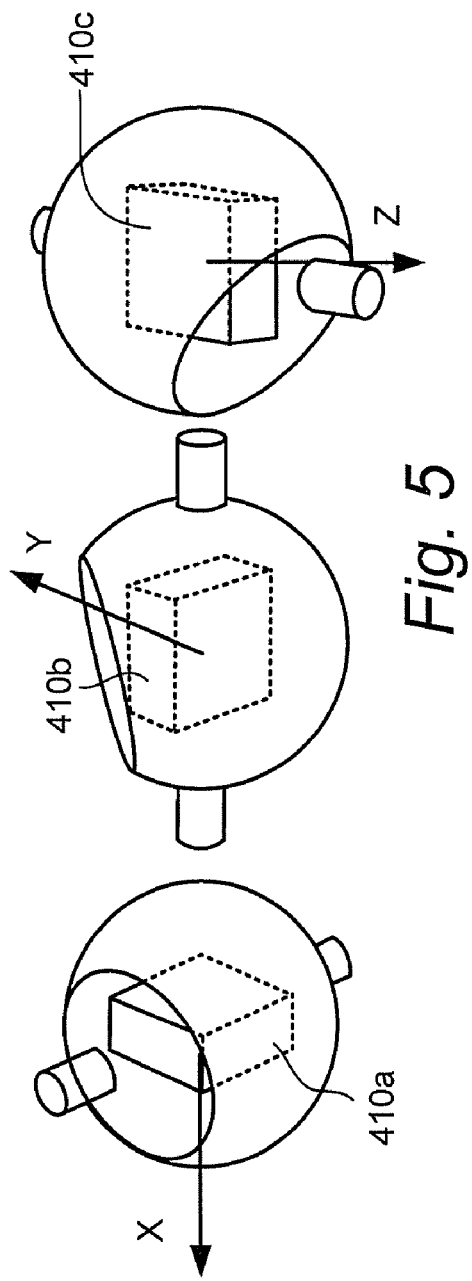

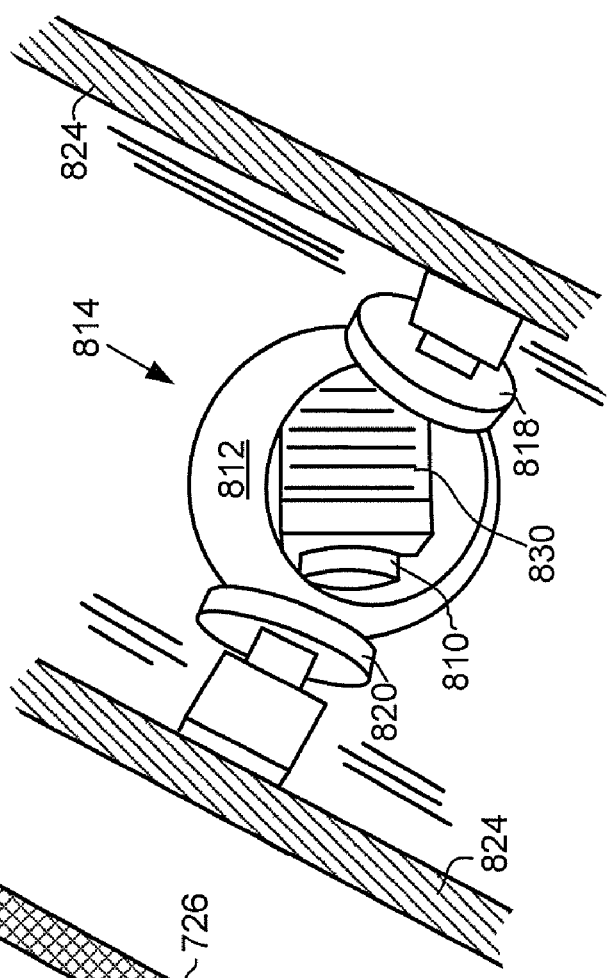
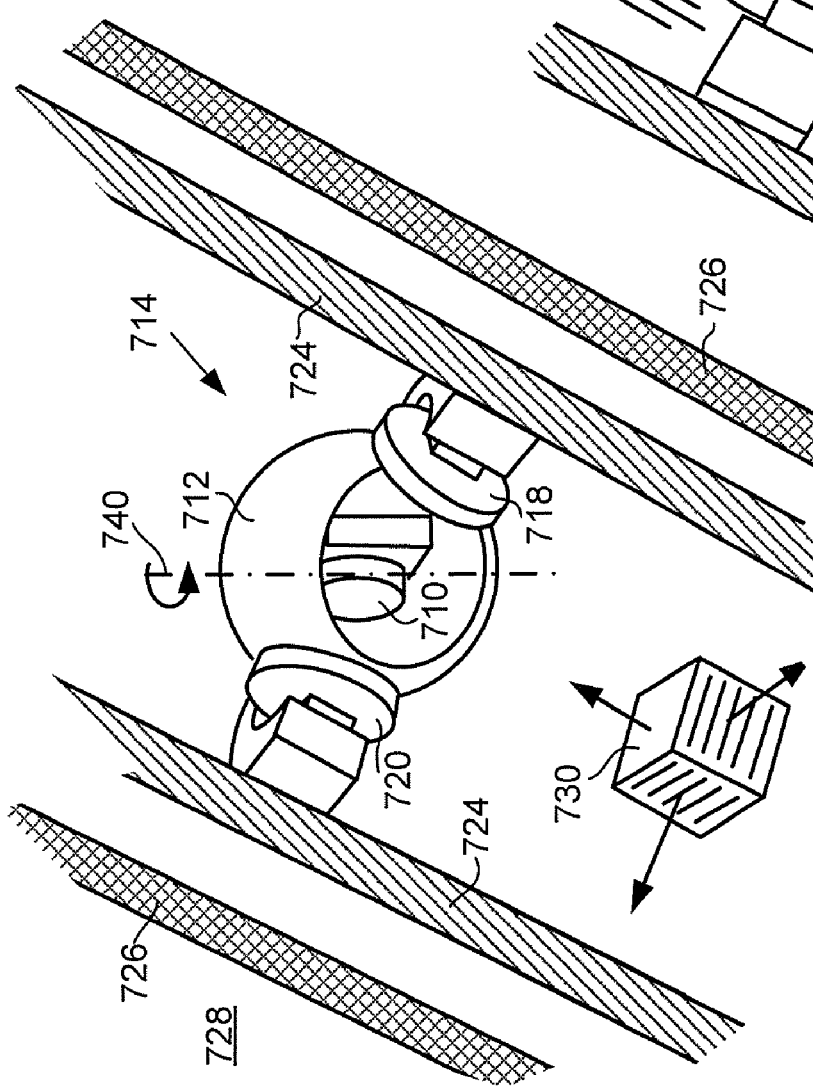

ACTIVE POSITIONING OF DOWNHOLE DEVICES USING SPHERICAL MOTORS

BACKGROUND OF THE INVENTION

1. Field of the Invention

This patent specification relates to positioning and/or orienting of downhole devices and, more particularly, to techniques for providing active positioning of downhole devices such as sensors using spherical motors such as spherical ultra-sonic motors.

2. Background of the Invention

In the field of borehole deployed devices, many components such as sensors significantly benefit or require downhole orientation and positioning. For example a downhole tiltmeter typically has at least two sensors mounted orthogonal to one another. Each of the sensors is typically individually adjusted to level or zero the sensors. For some known designs in downhole oilfield application the tiltmeter must be leveled once they have reached target depth. The tiltmeter sensors, thus have to be adjusted by certain amounts depending on the deviation of the well.

According to one known approach, the sensors are leveled by manipulating two cylindrical sleeves. See, U.S. Pat. No. 6,370,784. However, the two orthogonal sensors need to be installed at slightly different depths because of the size of the orienting mechanism. Additionally, the size of the sleeves requires that the tool housing is relatively long.

Other examples of known tiltmeter leveling techniques are described in U.S. Pat. No. 4,397,098 (Method and Apparatus for zeroing a Tiltmeter Mechanism) and U.S. Pat. No. 5,063,680 (Self-Erecting Tiltmeter).

Some known downhole inclinometers use a rigidly mounted 3-axis accelerometer to determine the gravity vector based on the 3-axis sensor output. In these designs it is essential to maintain scale factor consistency among 3 axes. Since the accelerometer scale factor changes due to temperature, compensation is required based on a temperature measurement and the pre-memorized calibration data acquired at surface for each individual axis of accelerometer. An optimistic assumption is often made that no change of the compensation coefficient is needed during the time between calibrations.

Another application where downhole orientation and positioning is used is with downhole gyroscopes. A downhole gyro can be used for north-seeking based on Earth spin detection. Some designed use three gyros to cover any conditions of well deviation, with each gyro corresponding to an orthogonal axis X, Y, or Z. In operation, when using a gyro having a performance grade such as with a MEMS gyro, each gyro needs to be flipped by 180 degrees and measures in two directions for each axis to cancel out the sensor bias offset. Thus, in total, the gyros need to measure the angular velocity for 6 directions.

In the case of downhole-deployed geophones, a gimbal mount is often used to maintain the geophones in the preferred positions like vertical or horizontal, independent from the well deviation and the tool posture. A conventional passive gimbal mount system depends on gravity force to maintain the position of the spherical geophone mount which is floating in oil. Sometimes, devices such as omni-tilt geophones are used instead of the gimbal mounted geophone, because the conventional passive gimbal is expensive and has mechanical reliability issues as it's fragile and it's easy to be stuck especially at high temperature. However, some users still believe that the use of omni-tilt geophones tends to result in less confidence in the seismic signal vector fidelity than when using gimbal mounted geophones.

As will become apparent from the following description and discussion, the present invention overcomes at least some of these deficiencies and provides an improved pressure transducer housing.

SUMMARY

According to embodiments, downhole tool system is provided. The system includes a downhole tool housing constructed and dimensioned to be deployed in a borehole within a subterranean rock formation. An active spherical rotating member is housed within the downhole tool, and a device is mounted to the spherical rotating member such that the device can be actively positioned in one or more orientations by activating the spherical rotating member. The active spherical rotating member preferably has three degrees of freedom. The device preferably includes a sensor element such as a gyroscope, an accelerometer, or a geophone.

According to some embodiments, a method of positioning a device in a borehole is provided. A device is deployed in a borehole within a subterranean rock formation, and actively positioned to one or more orientations using an active spherical rotating member.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 3A shows vessel deployed ocean bottom cable, according to embodiments;

FIG. 3B shows a land seismic operation, according to embodiments;

FIGS. 4 and 5 show an example of three downhole gyros 410a, 410b and 410c mounted such that each can rotate about a single axis;

FIG. 7 shows a gyroscope mounted in a spherical motor and an accelerometer, according to embodiments;

FIG. 8 shows a gyroscope and an accelerometer mounted inside a spherical motor, according to embodiments;

DETAILED DESCRIPTION OF THE PREFERRED EMBODIMENTS

In the following detailed description of the preferred embodiments, reference is made to accompanying drawings, which form a part hereof, and within which are shown by way of illustration specific embodiments by which the invention may be practiced. It is to be understood that other embodiments may be utilized and structural changes may be made without departing from the scope of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicate like elements.

According to various embodiments, a spherical motor is used to position/orient downhole sensors or arrays of sensors. Multiple sensors or types of sensors (for example, tiltmeter, geophone, inclinometer, etc.) arranged in multiple axes are positioned inside the spherical component of the 3D spherical motor. The spherical motor controls and rotates the sphere, in a smooth isotropic motion. Aside from the advantage of versatile orientation control, the sensor package becomes much more compact since multiple sensors require only one motor. The nature of the spherical motor is to freeze or lock the rotor and stator relative positions when powered off. Therefore, the sensors are in a fixed state during deployment and only free to move with activation of the motor. Also the compact nature of the motor makes it ideal for packing for downhole application.

Figure 1:
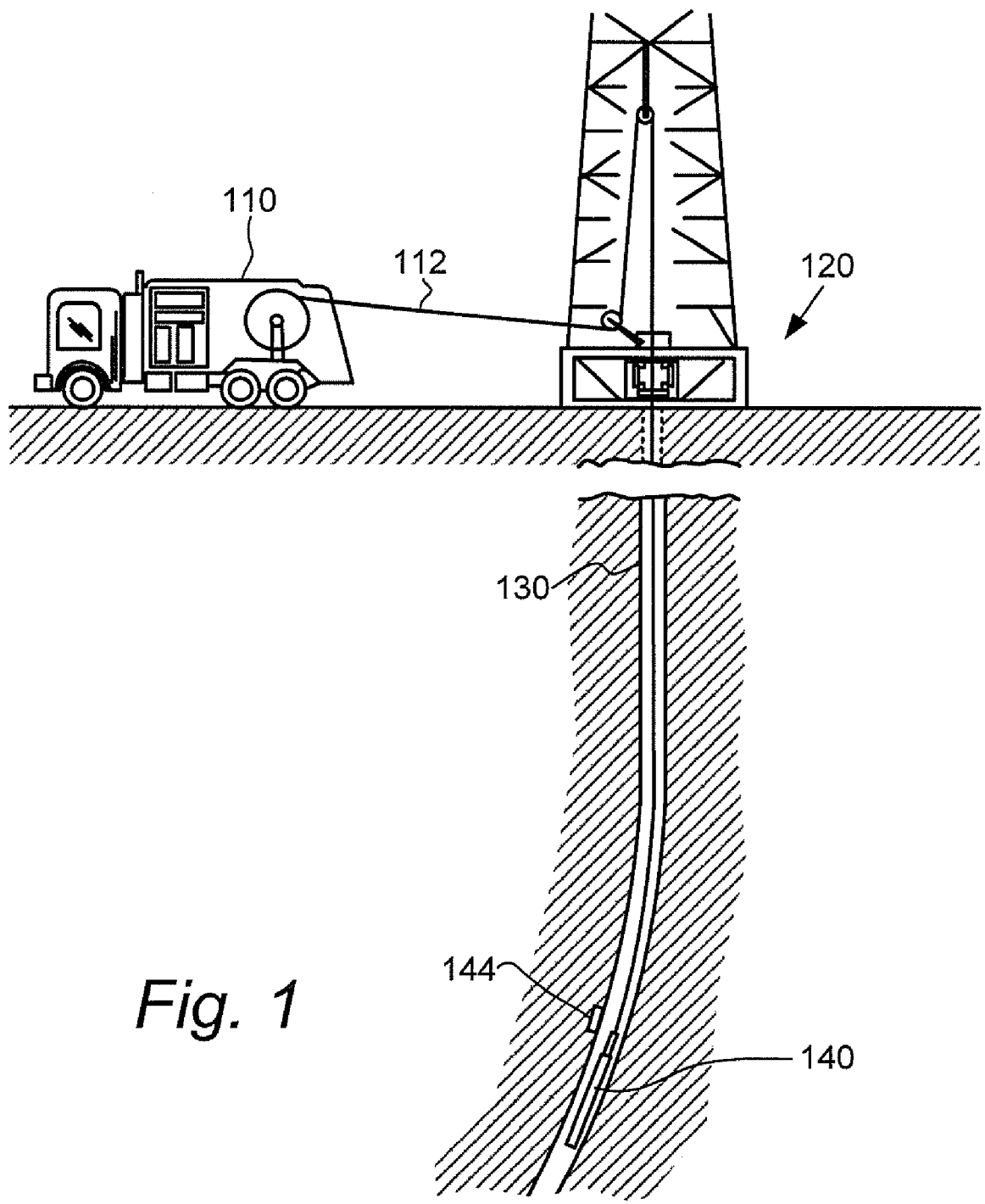
FIG. 1 shows a typical downhole setting for downhole sensor positioning, according to embodiments.

FIG. 1 shows a typical downhole setting for downhole sensor positioning, according to embodiments. Shown in FIG. 1 is wireline truck 110 deploying wireline cable 112 into well 130 via well head 120. Wireline tool 140 is disposed on the end of the cable 112. The wireline tool 140 includes one or more sensor that benefit from downhole orientation and/or positioning. Examples of such sensors include downhole tiltmeters, downhole inclinometers, downhole gyros and downhole geophones. As will be described in further detail below, wireline tool 140 also includes one or more spherical motors for positioning the downhole sensors. According to some embodiments one or more permanent or semi-permanent sensors 144 are deployed in well 130. The sensors 144 can be mounted to a casing in well 130, for example, and either communicate to the surface via a communication cable (not shown) or it can be interrogated by wireline tool 140. Sensors 144 include sensors of a type that benefit from downhole orientation and/or positioning. Examples of such sensors include downhole tiltmeters, downhole inclinometers, downhole gyros and downhole geophones.

Figure 2:
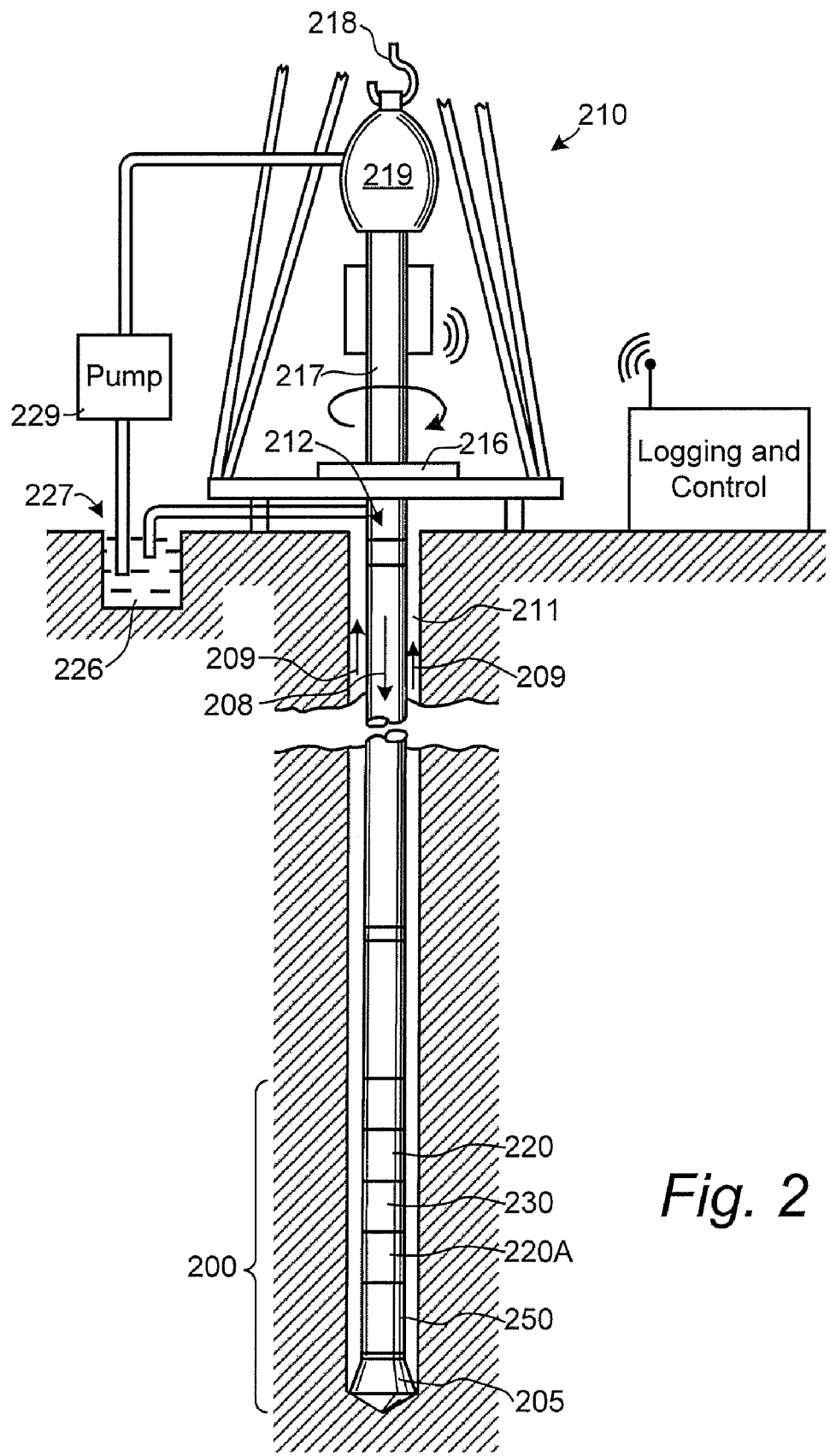
FIG. 2 illustrates a wellsite system in which the present invention can be employed, according to embodiments.

FIG. 2 illustrates a wellsite system in which the present invention can be employed, according to embodiments. The wellsite can be onshore or offshore. In this exemplary system, a borehole 211 is formed in subsurface formations by rotary drilling in a manner that is well known. Embodiments of the invention can also use directional drilling, as will be described hereinafter.

A drill string 212 is suspended within the borehole 211 and has a bottom hole assembly 200 which includes a drill bit 205 at its lower end. The surface system includes platform and derrick assembly 210 positioned over the borehole 211, the assembly 210 including a rotary table 216, kelly 217, hook 218 and rotary swivel 219. The drill string 212 is rotated by the rotary table 216, energized by means not shown, which engages the kelly 217 at the upper end of the drill string. The drill string 212 is suspended from a hook 218, attached to a traveling block (also not shown), through the kelly 217 and a rotary swivel 219 which permits rotation of the drill string relative to the hook. As is well known, a top drive system could alternatively be used.

In the example of this embodiment, the surface system further includes drilling fluid or mud 226 stored in a pit 227 formed at the well site. A pump 229 delivers the drilling fluid 226 to the interior of the drill string 212 via a port in the swivel 219, causing the drilling fluid to flow downwardly through the drill string 212 as indicated by the directional arrow 208. The drilling fluid exits the drill string 212 via ports in the drill bit 205, and then circulates upwardly through the annulus region between the outside of the drill string and the wall of the borehole, as indicated by the directional arrows 209. In this well known manner, the drilling fluid lubricates the drill bit 205 and carries formation cuttings up to the surface as it is returned to the pit 227 for recirculation.

The bottom hole assembly 200 of the illustrated embodiment a logging-while-drilling (LWD) module 220, a measuring-while-drilling (MWD) module 230, a roto-steerable system and motor 250, and drill bit 205.

The LWD module 220 is housed in a special type of drill collar, as is known in the art, and can contain one or a plurality of known types of logging tools. It will also be understood that more than one LWD and/or MWD module can be employed, e.g. as represented at 220A. (References, throughout, to a module at the position of 220 can alternatively mean a module at the position of 220A as well.) The LWD module includes capabilities for measuring, processing, and storing information, as well as for communicating with the surface equipment. In the present embodiments, the LWD module includes a sensor, such as a geophone, inclinometer, tiltmeter and/or gyroscope, that benefits from downhole positioning and/or orientation. As will be described in further detail the LWD module also includes one or more spherical motors to position and/or orient such sensors. According to some embodiments, the various processing steps described herein are carried out in a processor located within LWD module 220.

The MWD module 230 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device. The MWD module can also include, either as part of one or more of the above mentioned devices or separately, one or more sensors, such as a inclinometer and/or gyroscope, that benefits from downhole positioning and/or orientation. As will be described in further detail such MWD modules also include one or more spherical motors to position and/or orient such sensors.

FIG. 3A shows vessel deployed ocean bottom cable, according to embodiments. Seismic vessel 310 is shown on the sea surface 320. Below on the sea bottom 332 is ocean bottom cable 312, including thereon a number of geophone sensors 314 each housed in spherical motors for positioning as will be described in further detail below. FIG. 3B shows a land seismic operation, according to embodiments. A number of geophone sensors 350 are deployed across the surface of land surface 362. Seismic vibratory source truck 352 sends seismic energy into the earth 360 which reflects of various subterranean interfaces, such as interface 364, which reflect some of the energy back toward geophone sensors 350. According to embodiments, each of the geophone sensors 350 are housed in a spherical motor for positioning, as will be described in further detail below.

FIGS. 4 and 5 show an example of three downhole gyros 410a, 410b and 410c mounted such that each can rotate about a single axis. FIG. 4 shows gyros 410a, 410b and 410c in the +X, +Y and +Z directions respectively. FIG. 5 shows the gyros 410a, 410b and 410c rotated 180 degrees, to the –X, –Y and –Z directions respectively. For further information, see U.S. patent application Ser. No. 12/233,592, filed on Sep. 19, 2008, entitled "Methods and Systems of Azimuth Measurement Using Gyro Sensors, and U.S. patent application Ser. No. 12/240,943, filed on Sep. 29, 2008, entitled "Apparatus for Azimuth Measurements Using Gyro Sensors" both of which are incorporated herein by reference.

Figure 6:
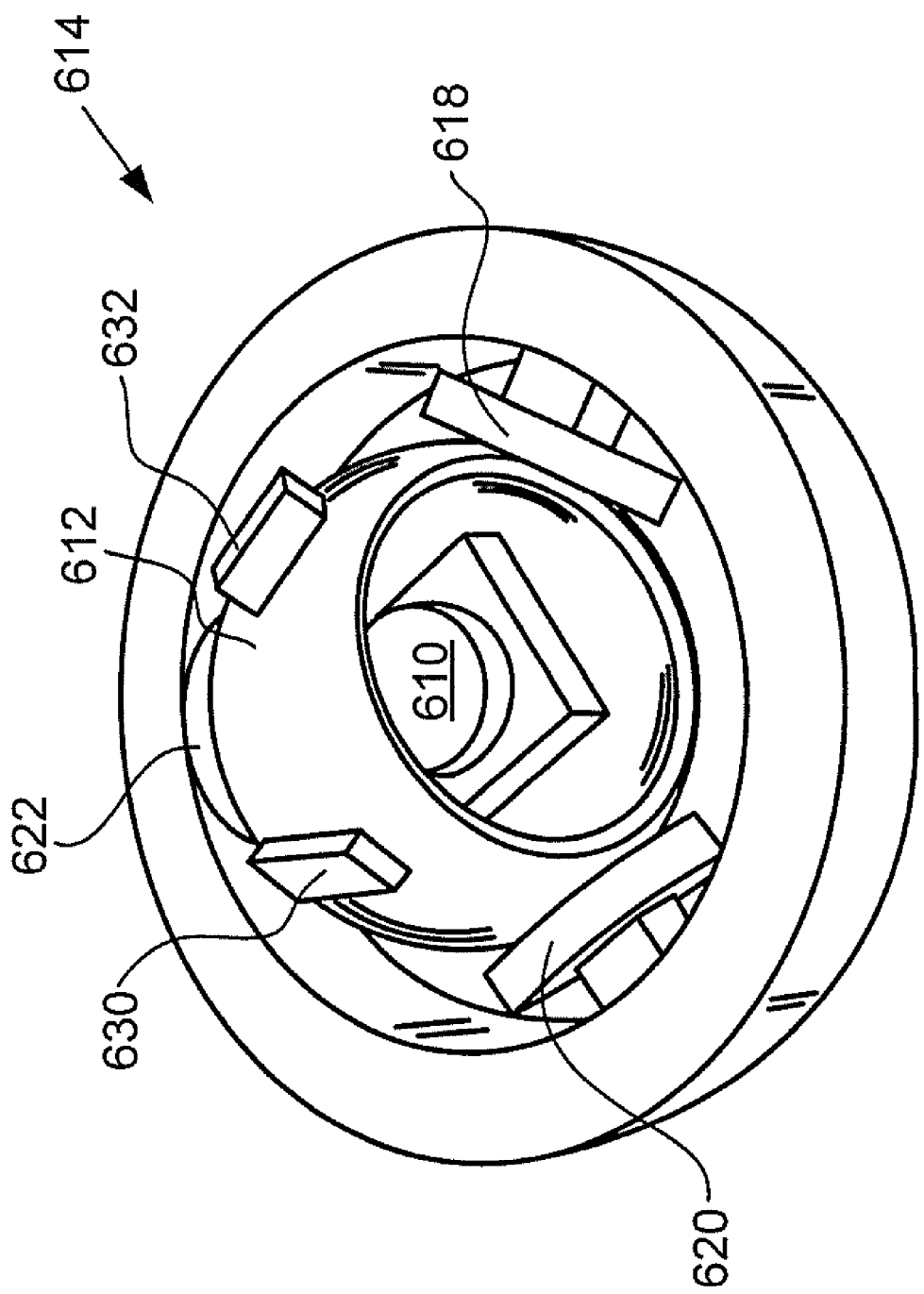
FIG. 6 shows an example of a downhole gyro mounted within a spherical motor, according to embodiments.

FIG. 6 shows an example of a downhole gyro mounted within a spherical motor, according to embodiments. MEMS gyro 610 is mounted inside of the spherical rotor 612 of the spherical ultra-sonic motor 614. Spherical ultra-sonic motor 614 also includes three stators 618, 620 and 622. Examples of suitable spherical ultrasonic motors are manufactured by Double Giken KK of Japan. For further details, see Japanese Patent Abstracts Publication Nos. 2000270569A, 2007135266A, 2007135267A, 2007135268A, 2007135269A, 2007135270A, 2007221845A and 2007221846A, each of which is incorporated by reference herein. An example of a suitable MEMS Gryos sensor elements for used in a spherical motor can be found in model number CRS09 from Silicon Sensing Systems Japan. For further details see, http://www.sssj.co.jp/en/products/gyro/crs09.html, which is incorporated herein by reference. Although MEMS gyro is shown in FIG. 6, in practice any type of gyro suitable for downhole Earth-spin measurement can be used, such as mechanical gyros or optic based gyros.

Also shown in FIG. 6 are spherical rotation angle measurement sensors 630 and 632. Rotation angle sensor 630 and 632 provide feedback to the system by measuring the rotation angular position of spherical rotor 612. Sensors 630 and 632, which measure two dimensional motion of spherical rotor 612 (e.g. X and Y measurements), can be magnetic sensors, optical sensors or any other type of sensor than can detect accurately detect motion of spherical rotor 612. Although rotation angle sensors as shown in FIG. 6 are not explicitly shown in the subsequent figures, it is understood that, according to embodiments, such sensors are included.

Importantly, the spherical ultra-sonic motor 614 allows for 3 degrees-of-freedom. This enables the orientation of the MEMS gyro for measurements in six directions with only a single MEMS gyro device. This approach is therefore much less prone to mechanical positioning errors such as gear backlash. Additionally, the size of the overall sensor package can be made significantly smaller than designs having three separate MEMS Gyros. Due to the nature of the ultrasonic motor, once the sensor position is set, the motor doesn't need any power to hold the sensor.

FIG. 7 shows a gyroscope mounted in a spherical motor and an accelerometer, according to embodiments. In this example, a 3-axis accelerometer 730 is mounted outside of spherical rotor 714. As in the previous example, gyro 710 is mounted inside spherical rotor 712, and ultra-sonic motor 714 includes stators 718 and 720. The motor 714 and external accelerometer 730 are both mounted in a downhole tool having tool wall 724. The Downhole tool is shown deployed in a subterranean rock formation 728 having a casing 726. Thus, using the spherical motor, gyro measurements can be performed under the preferred gyro sensor positional orientation, such as in the horizontal plane or in the plane parallel to the Earth spin axis independent from the well deviation or the posture of the down-hole tool, or aligned to a chosen geological feature. The single gyro arrangement shown and described can therefore provide quality improvements over even three-gyro designs.

FIG. 8 shows a gyroscope and an accelerometer mounted inside a spherical motor, according to embodiments. In this example, a 3-axis accelerometer 830 and gyro 810 are both mounted inside spherical rotor 812. Ultra-sonic motor 814 also includes stators 818 and 820. A third stator is also included, but is out of view in FIG. 8. The motor 814 is mounted in a downhole tool having tool wall 824. Note that the design shown in FIG. 8 is more compact than that of FIG. 7. According to another embodiment, accelerometer 830 is a 1-axis accelerometer instead of a 3-axis accelerometer. The 1-axis accelerometer 830 can accurately sense the direction of gravity by operating it in different orientations provided by the spherical motor. Examples of suitable accelerometer sensor elements for mounting in a spherical motor are model numbers SCA610 and SCA620 from VTI Technologies Oy of Finland. For further details of such accelerometers see, e.g. http://www.vti.fi/midcom-serveattachmentguid-69838626362911dd8b327d614b19a938a938/sca610_accelerometer_rev_3.pdf, and http://www.vti.fi/midcom-serveattachmentguid-d343b9ec362811ddb00ad7313e440e2a0e2a/sca620_accelerometer_rev_2_021106.pdf, both of which are incorporated herein by reference.

Figure 9:
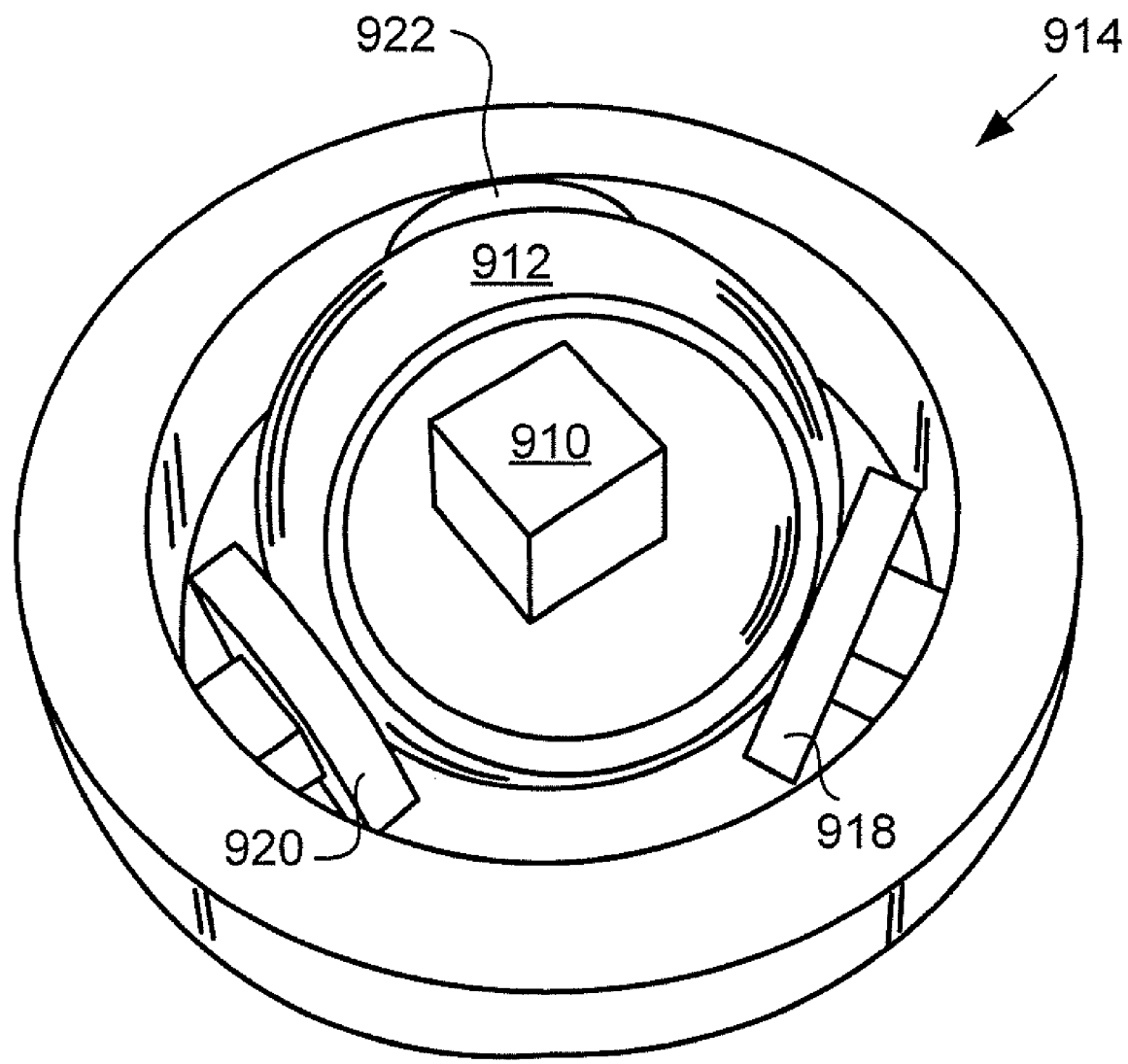
FIG. 9 shows an accelerometer mounted inside a spherical motor, according to embodiments.

FIG. 9 shows an accelerometer mounted inside a spherical motor, according to embodiments. A 1-axis accelerometer 910 is mounted inside of the spherical rotor 912 of the spherical ultra-sonic motor 914. Spherical ultra-sonic motor 914 also includes three stators 918, 920 and 922. The arrangement shown in FIG. 9 is capable of covering 3-axis measurements with 1-axis sensor 910 by changing sensor position using the spherical rotor 912. The arrangement can be used, for example, to determine the gravity direction vector in a downhole tool positioned in a non-vertical well. Using a 1-axis sensor, eliminates error due to scale factor difference between each axis of a 3-axis accelerometer. Note that with the arrangement shown in FIG. 9, in-situ accelerometer scale factor and bias calibration is possible, occasionally after determining gravity direction, by measuring +1 g and –1 g.

According to another embodiment, accelerometer 910 is a 3- or more axis accelerometer, which allows a more robust sensor due to redundancy and/or backup capabilities.

Figure 10:
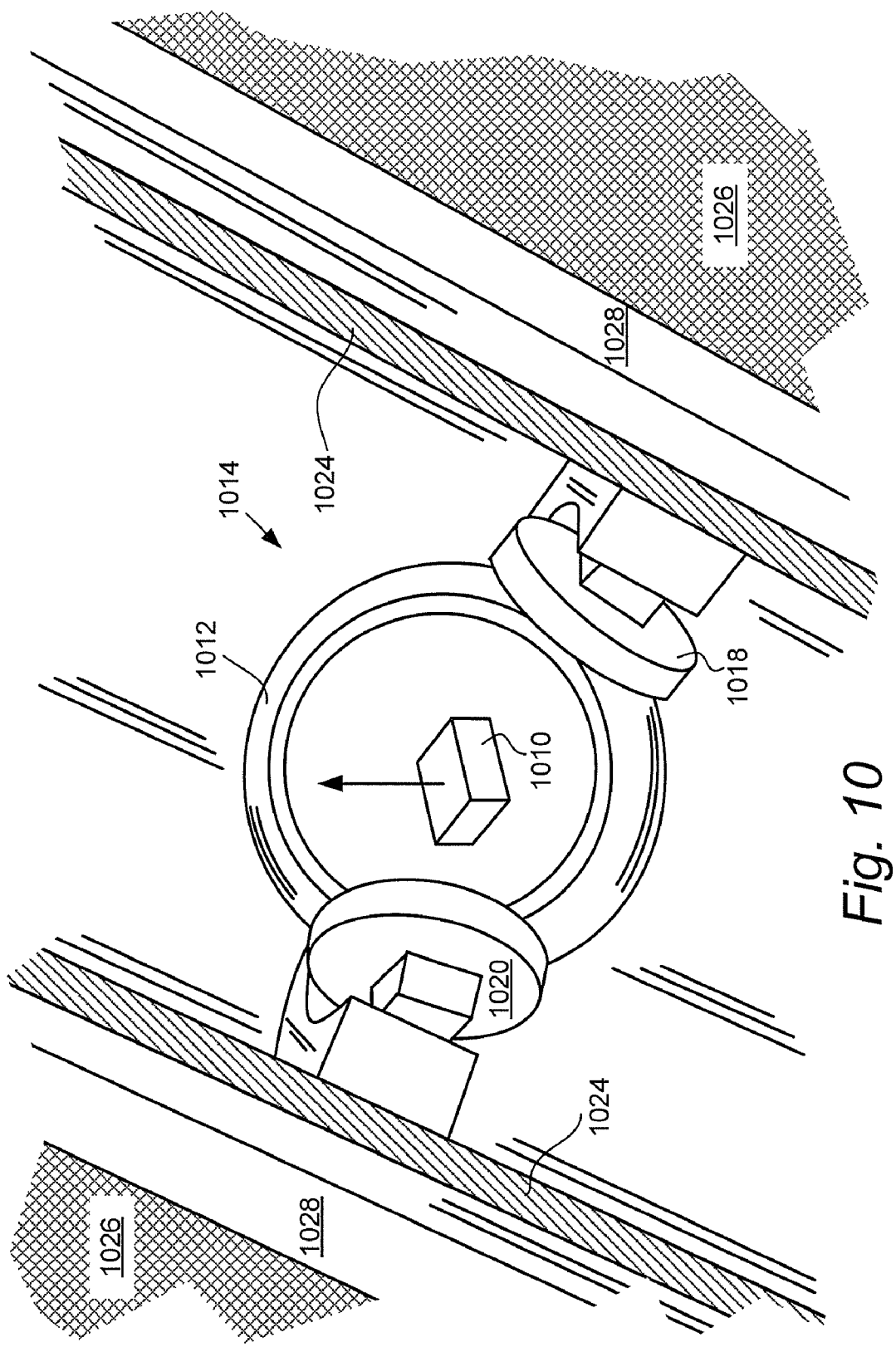
FIG. 10 shows a 1-axis accelerometer mounted in a spherical motor housed in a downhole deployed tool, according to embodiments.

FIG. 10 shows a 1-axis accelerometer mounted in a spherical motor housed in a downhole deployed tool, according to embodiments. 1-axis accelerometer 1010 is mounted inside of the spherical rotor 1012 of the spherical ultra-sonic motor 1014. Spherical ultra-sonic motor 1014 also includes stators 1018 and 1020. A third stator is also included, but is out of view in FIG. 10. Spherical motor 1014 is mounted in a downhole tool having tool housing 1024. The Downhole tool is shown deployed in a borehole 1028 within subterranean rock formation 1026. As in the case of the arrangement shown in FIG. 9, the 1-axis accelerometer can be used to determine the gravity vector. A calibration procedure can also be carried out by positioning the accelerometer flipped upside down such that it detects −1 g instead of +1 g.

The arrangements shown in FIGS. 9 and 10 has several advantages over a rigidly mounted 3-axis accelerometers, which determine gravity vector based on 3-axis sensor output. Rigidly mounted 3-axis accelerometers must maintain scale factor consistency among 3 axes. The accelerometer scale factor tends to change due to temperature, therefore a compensation is often required based on temperature measurement and the pre-memorized calibration data acquired at surface for each individual axis of accelerometer. Also, an optimistic assumption is often made that no change of the compensation coefficient is needed during the time between calibrations of the rigidly mounted accelerometers.

Figure 11:
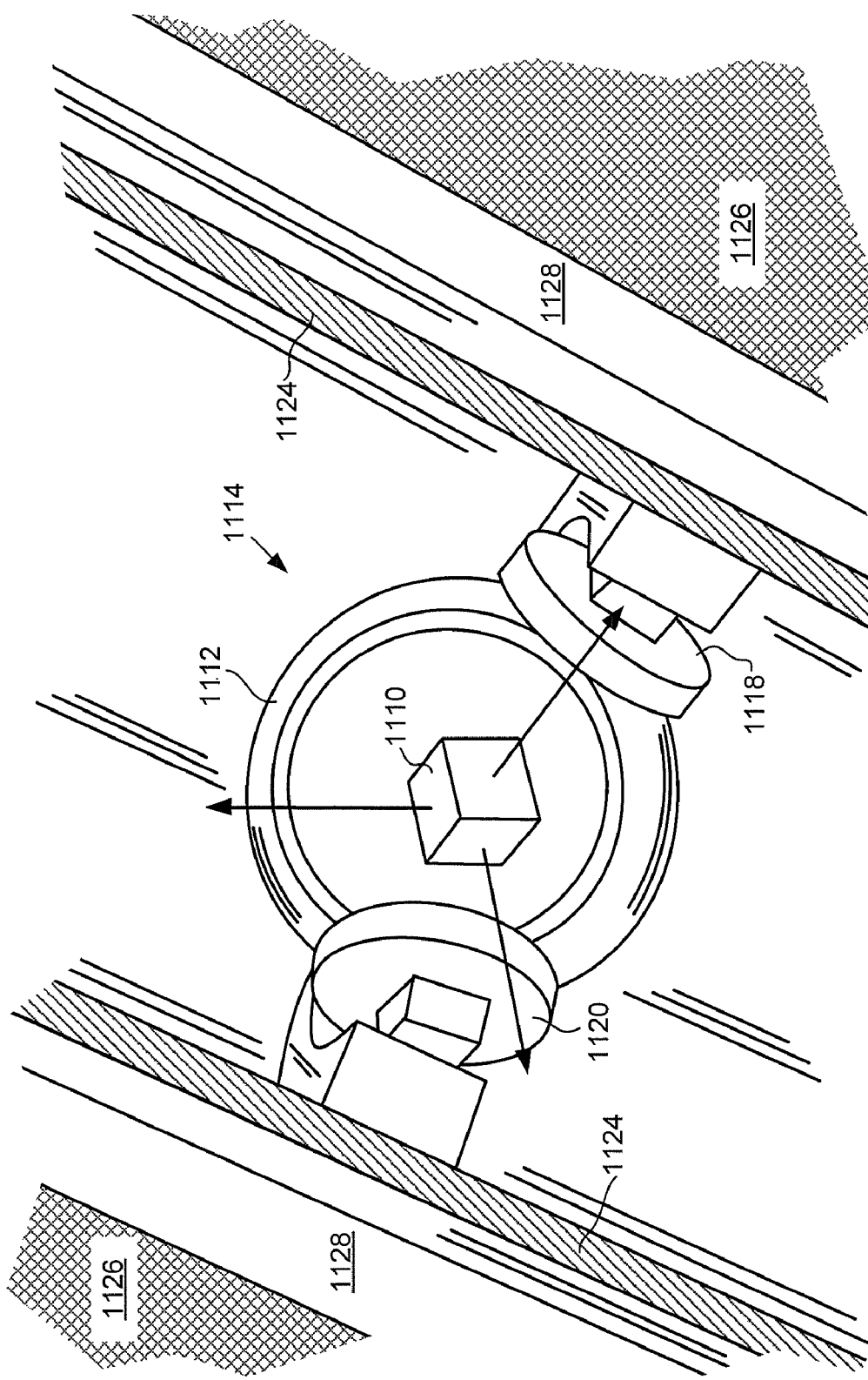
FIG. 11 shows a 3-axis accelerometer mounted in a spherical motor housed in a downhole deployed tool, according to embodiments.

FIG. 11 shows a 3-axis accelerometer mounted in a spherical motor housed in a downhole-deployed tool, according to embodiments. 3-axis accelerometer 1110 is mounted inside of the spherical rotor 1112 of the spherical ultra-sonic motor 1114. Spherical ultra-sonic motor 1114 also includes stators 1118 and 1120. A third stator is also included, but is out of view in FIG. 11. Spherical motor 1114 is mounted in a downhole tool having tool housing 1124. The Downhole tool is shown deployed in a borehole 1128 within subterranean rock formation 1126. Using a 3-axis accelerometer allows for a more robust measurement device than a 1-axis since there are redundant sensors.

Figure 12:
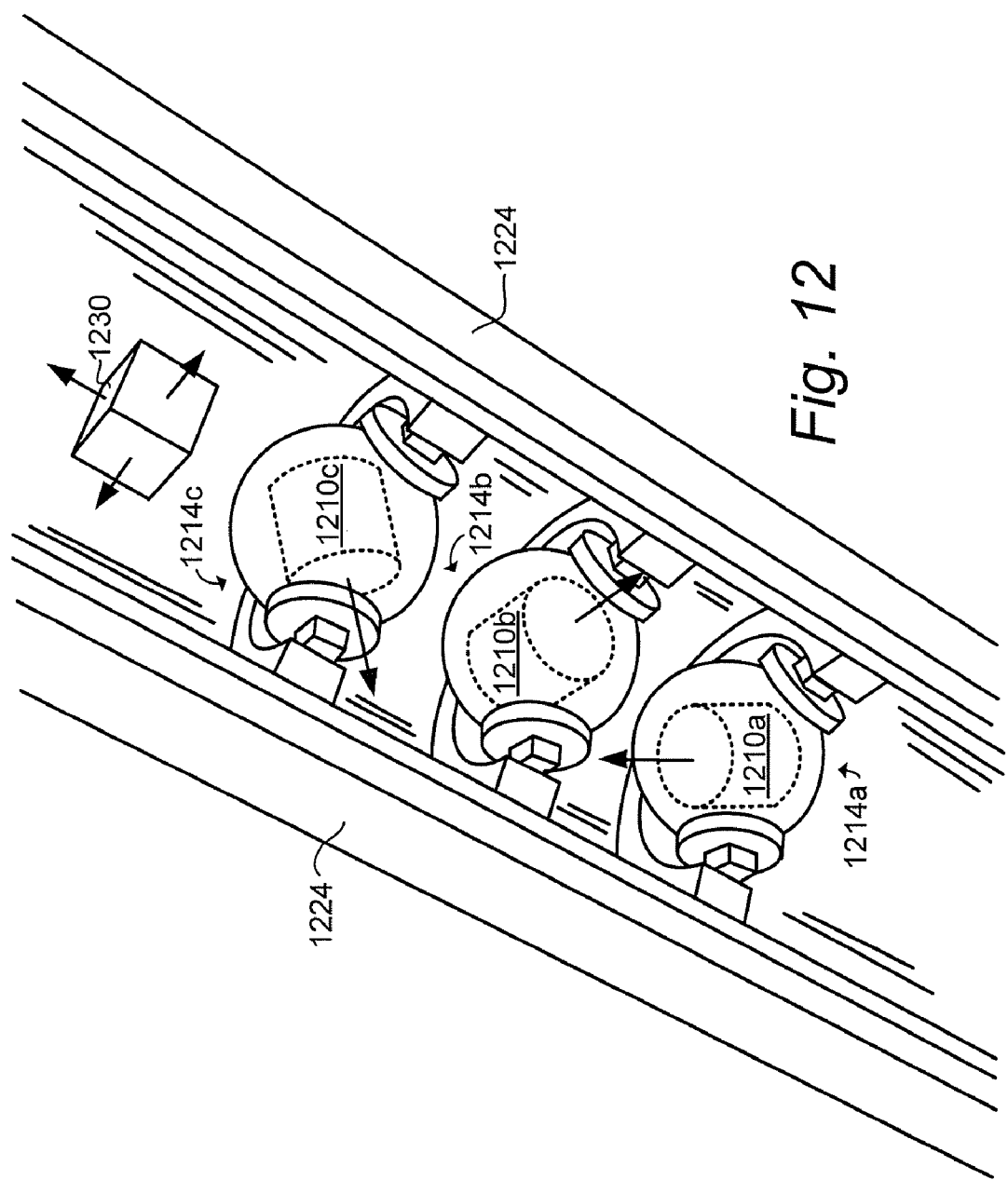
FIG. 12 shows an example of active gimbals for downhole geophones, according to embodiments.

FIG. 12 shows an example of active gimbals for downhole geophones, according to embodiments. Geophones 1210a, 1210b and 1210c are mounted inside the spherical rotors of spherical ultra-sonic motors 1214a, 1214b and 1214c respectively. Spherical ultra-sonic motors 1214a, 1214b and 1214c each also include three stators, of which two on each motor are shown. Spherical motors 1214a, 1214b and 1214c are mounted in a downhole tool having tool housing 1224. The Downhole tool can be deployed in a borehole within subterranean rock formation (not shown). By mounting the geophone inside of a spherical rotor of the spherical ultra-sonic motor, the motor is able to actively control the posture of the geophone. 3-axis accelerometer 1230 is rigidly outside of the motors within tool housing 1224. Depending on inclination measurement with 3-axis accelerometer 1230, the motors 1214a, 1214b and 1214c actively re-position geophones 1210a, 1210b and 1210c in the vertical or horizontal positions as shown prior to data acquisition. When compared to conventional gimbal mounted geophones, arrangements such as shown in FIG. 12 enable a more reliable operation and straightforward processing based on vector fidelity.

According to another embodiment, an accelerometer is mounted inside one or more of the spherical motors 1214a, 1214b and 1214c and operates to determine the gravity vector as shown and described with respect to FIGS. 9-11 prior to positioning the geophones 1210a, 1210b and 1210c. The accelerometer can be a 1-axis as shown in FIGS. 9-10 or it can be a 3-axis as shown in FIG. 11. According to a yet further embodiment, the accelerometer is mounted in a separate spherical motor which is dedicated to determining the gravity vector.

Further detail on geophones suitable for mounting within a spherical motor are described in U.S. Pat. No. 7,099,235, which is incorporated herein be reference. Another example of a geophone that is suitable for use with a spherical motor is the OMNI-2400 from Oyo Geospace. See, e.g. http://www.oyogeospace.com/pdfs/technologies_brochure.pdf, which is incorporated by reference herein.

Figure 13:
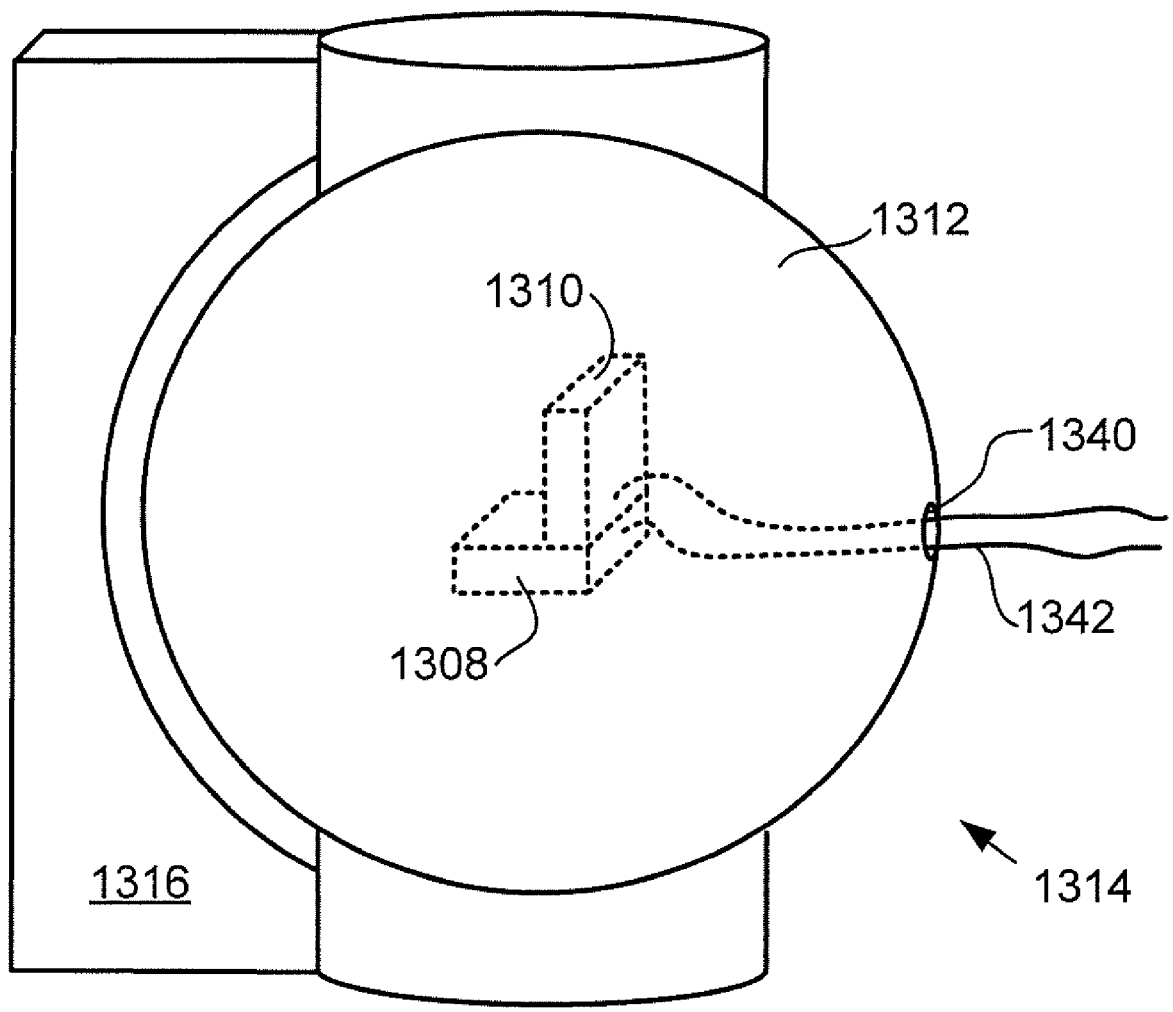
FIG. 13 shows another example of two tilt sensors mounted in a spherical motor for downhole use, according to embodiments.

FIG. 13 shows another example of two tilt sensors mounted in a spherical motor for downhole use, according to embodiments. Tilt sensor 1308 is mounted orthogonal to tilt sensor 1310. Both sensors are mounted inside of the spherical rotor 1312 of the spherical motor 1314. Spherical motor 1314 also includes motor mount 1316. Spherical motor 1314 is mounted in a downhole tool having tool housing (not shown). The use of spherical motor 1314 eliminates the need for multiple motors thereby making the design much more compact. The sensor lead wires 1342 come out of the spherical rotor 1312 via opening 1340. Note that the sphere motion is slightly limited due to the opening 1340. This type of motor control development is expected to continue to improve to produce a smooth and fine adjustment, especially for tiltmeter application.

Whereas many alterations and modifications to the embodiments described herein will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A downhole tool system comprising:
   a downhole tool housing constructed and dimensioned to be deployed in a borehole within a subterranean rock formation;
   an active spherical rotating member housed within the downhole tool; and
   a device mounted to the spherical rotating member such that the device can be actively positioned in one or more orientations by activating the spherical rotating member.

2. A system according to claim 1 wherein the active spherical rotating member has at least two degrees of freedom.

3. A system according to claim 2 wherein the active spherical rotating member has three degrees of freedom.

4. A system according to claim 1 wherein the device is a sensor element.

5. A system according to claim 4 wherein the sensor element is mounted within the spherical rotating member.

6. A system according to claim 5 wherein the sensor element includes a gyroscope suitable for downhole use.

7. A system according to claim 6 wherein the gyroscope is a of a type selected from a group of types of gyros consisting of: MEMS gyro, mechanical gyro, and optic based gyro.

8. A system according to claim 6 further comprising an accelerometer mounted within the downhole tool housing.

9. A system according to claim 8 wherein the accelerometer is a three-axis accelerometer.

10. A system according to claim 8 wherein the accelerometer is mounted within the active spherical rotating member.

11. A system according to claim 8 wherein the accelerometer is fixedly mounted onto the downhole tool housing.

12. A system according to claim 5 wherein the sensor element includes a geophone suitable for downhole use.

13. A system according to claim 12 further comprising:
a second and third active spherical rotating member each housed within the downhole tool housing; and
a second and third geophone mounted within the second and third spherical rotating members respectively.

14. A system according to claim 13 further comprising an accelerometer mounted within the downhole tool housing.

15. A system according to claim 5 wherein the sensor element is an accelerometer.

16. A system according to claim 15 wherein the accelerometer is a 1-axis accelerometer.

17. A system according to claim 15 wherein the accelerometer is a 3-axis accelerometer.

18. A system according to claim 1 wherein the downhole tool housing forms part of a wireline tool.

19. A system according to claim 1 wherein the downhole tool housing forms part of a drill collar and the system is constructed and arranged so as to allow operation during the construction of a borehole.

20. A system according to claim 1 wherein the downhole tool housing is designed and constructed so as to be permanently or semi-permanently mounted within the borehole.

21. A system according to claim 1 further comprising a spherical rotation sensor positioned with respect to the spherical rotating member so as to detect rotation and/or angular position of the spherical rotating member.

22. A method of positioning a device in a borehole comprising
deploying a device in a borehole within a subterranean rock formation; and
actively positioning the device downhole to one or more orientations using an active spherical rotating member.

23. A method according to claim 22 wherein the active spherical rotating member has three degrees of freedom.

24. A method according to claim 22 wherein the device is a sensor element mounted within the spherical rotating member.

25. A method according to claim 24 wherein the sensor element includes a gyroscope suitable for downhole use.

26. A method according to claim 25 further comprising:
deploying an accelerometer in the borehole; and
determining a gravity vector using the accelerometer.

27. A method according to claim 26 wherein the accelerometer is a three-axis accelerometer.

28. A method according to claim 26 wherein the accelerometer is mounted within the active spherical rotating member.

29. A method according to claim 26 wherein the accelerometer is fixedly mounted onto a downhole tool housing deployed in the borehole.

30. A method according to claim 25 wherein the sensor element includes a geophone suitable for downhole use.

31. A method according to claim 30 further comprising:
deploying a second and third geophone in the borehole; and
actively positioning the second and third geophones using a second and third active spherical rotating member respectively.

32. A method according to claim 31 further comprising deploying an accelerometer in the borehole; and
determining a gravity vector using the accelerometer.

33. A method according to claim 25 wherein the sensor element is an accelerometer.

34. A method according to claim 33 wherein the accelerometer is a 1-axis accelerometer.

35. A method according to claim 34 wherein the accelerometer is a 3-axis accelerometer.

36. A method according to claim 22 wherein the device is deployed using and is part of a wireline tool.

37. A method according to claim 22 wherein the device is deployed on a drill collar and the device is actively positioned downhole during the construction of the borehole.

38. A method according to claim 22 wherein the device is permanently or semi-permanently mounted within the borehole.

39. A method according to claim 22 further comprising detecting rotation and/or angular position of the spherical rotating member using one or more sensors.

40. A system for positioning one or more devices when in use in the oilfield service environment:
an active spherical rotating member; and
a device mounted within the spherical rotating member such that the device can be actively positioned in one or more orientations by activating the spherical rotating member.

41. A system according to claim 40 wherein the device and spherical rotating member form part of a seismic survey apparatus.

42. A system according to claim 41 wherein the device is a first geophone, and the system further comprises a second and third active spherical rotating member, and a second and third geophone mounted within the second and third spherical rotating members respectively.

43. A system according to claim 42 wherein the spherical rotating members form part of an ocean bottom cable for use in conducting seismic surveys.

44. A system according to claim 40 wherein the active spherical rotating member has three degrees of freedom.

45. A system according to claim 42 wherein the spherical rotating members form part of land-based surface seismic unit for use in conducting seismic surveys.

* * * * *